United States Patent
Dubuc et al.

(10) Patent No.: US 8,242,431 B2
(45) Date of Patent: Aug. 14, 2012

(54) AUTOMATED DE-ICING SYSTEM FOR LOW POWER LIGHTING APPARATUS

(75) Inventors: Eden Dubuc, St-Michel (CA); Dan Mihai, Pointe-Claire (CA); Christian Auger, St-Bruno (CA)

(73) Assignee: GE Lighting Solutions, LLC, Cleveland, OH (US)

( * ) Notice: Subject to any disclaimer, the term of this patent is extended or adjusted under 35 U.S.C. 154(b) by 345 days.

(21) Appl. No.: 12/632,913

(22) Filed: Dec. 8, 2009

(65) Prior Publication Data

US 2010/0149785 A1 Jun. 17, 2010

Related U.S. Application Data

(60) Provisional application No. 61/122,059, filed on Dec. 12, 2008.

(51) Int. Cl.
 *H01J 40/14* (2006.01)
(52) U.S. Cl. ............ 250/221; 250/222.2; 250/573; 362/92; 219/494; 219/502
(58) Field of Classification Search .......... 250/573, 250/574, 221, 222.1, 222.2; 362/92, 249.02, 362/294, 373; 219/490, 494, 502
See application file for complete search history.

(56) References Cited

U.S. PATENT DOCUMENTS 6,045,240 A * 4/2000 Hochstein ............. 362/294
2007/0114225 A1 5/2007 Smith et al.

FOREIGN PATENT DOCUMENTS

| DE | 10 2006 050 926 | 5/2007 |
| EP | 1 234 486 | 3/2005 |
| EP | 1 809 074 | 7/2007 |
| KR | 100 805 171 | 2/2008 |

OTHER PUBLICATIONS

European Search Report dated Mar. 4, 2010.

* cited by examiner

*Primary Examiner* — Kevin Pyo
(74) *Attorney, Agent, or Firm* — Fay Sharpe LLP

(57) ABSTRACT

An automated de-icing system for a low power lighting device having a light emitting face. The system includes one or more detectors for detecting conditions under which ice, frost or snow are likely to occur on the light emitting face. The system further includes a heat transfer system for transferring heat to the light emitting face and a controller for receiving data from the detector(s) and determining a likelihood of ice, frost or snow forming on the light emitting face. The controller engages the heat transfer system if the likelihood of ice, frost or snow forming on the light emitting face exceeds a threshold.

17 Claims, 3 Drawing Sheets

AUTOMATED DE-ICING SYSTEM FOR LOW POWER LIGHTING APPARATUS

This application claims the benefit of U.S. Provisional Application No. 61/122,059, filed Dec. 12, 2008, incorporated herein by reference in its entirety.

BACKGROUND

The present exemplary embodiments relate to an automated de-icing system for low power lighting apparatus. They find particular application in conjunction with LED lighting applications and will be described with particular reference thereto. However, it is to be appreciated that the present exemplary embodiments are also amenable to other like applications.

Outdoor lighting has traditionally used incandescent lighting devices. During winter time, heat generated and transferred to the light emitting face of the incandescent lighting device is usually sufficient to prevent the build up and accumulation of ice, frost and snow on the light emitting face. However, low power lighting devices have become increasingly popular for outdoor lighting. Such devices include traffic signals, wayside rail signals, area lighting devices, street lighting devices, tunnel lighting devices, architectural lighting devices and any other lighting device using one or more Light Emitting Diodes (LEDs).

Unfortunately, low power lighting devices generally generate and transfer less heat to the light emitting face, and in winter time, when humidity, temperature and wind conditions are "favorable," ice, frost or snow can accumulate on the light emitting face of a lighting device, such as a traffic signal using LEDs. This accumulation can be such that a major part of the light emitting face of the lighting device is covered, thus preventing the lighting device from performing its primary function: emitting light or illuminating a signal. Naturally, the absence or the reduction of illumination from the device will cause safety issues. For instance, if the light emitting face of a red traffic signal is mostly blocked off, motorists from one direction will not receive a stop signal and will fail to stop when required to do so, thereby increasing the likelihood of an accident occurring.

Known systems for detecting the buildup of ice, frost or snow on the light emitting face of a lighting device use optical methods for detecting the buildup. Consequently, such systems are reactive to an existing buildup on the light emitting face of the lighting device. However, tests have found that it is better to prevent ice, frost or snow buildup than to remove it. Namely, the amount of heat and time required are less. Additionally, the light emitting face of a lighting device is already compromised by the time a reactive system detects it. Accordingly, it would be advantageous to have a de-icing system for low power lighting systems that is proactive instead of reactive.

As low power lighting devices become more common, the problems associated with ice, frost and snow building up on the light emitting face of the low power lighting devices will become more common. Thus, there is a need for a method and apparatus for removing and/or preventing the buildup of ice, frost or snow on the light emitting face of low power lighting devices.

BRIEF DESCRIPTION

In accordance with an aspect of the present invention, an automated de-icing system for a low power lighting device having a light emitting face is provided. The system includes one or more detectors for detecting conditions under which ice, frost or snow are likely to occur on the light emitting face. The system further includes a heat transfer system for transferring heat to the light emitting face and a controller for receiving data from the detector(s) and determining a likelihood of ice, frost or snow forming on the light emitting face. The controller engages the heat transfer system if the likelihood of ice, frost or snow forming on the light emitting face exceeds a threshold.

In accordance with another aspect of the present invention, an automated de-icing method for a low power lighting device having a light emitting face is provided. The method includes detecting one or more conditions under which ice, frost or snow are likely to occur on the light emitting face and receiving data of the condition(s). The method further includes determining a likelihood of ice, frost or snow forming on the light emitting face from the received data and transferring heat to the light emitting face if the likelihood of ice, frost or snow forming on the light emitting face exceeds a threshold.

In accordance with yet another aspect of the present invention, a low power lighting system is provided. The system includes a housing having one or more LEDs disposed therein and an automated de-icing system. The housing includes a light emitting face. The automated de-icing system includes one or more detectors for detecting conditions under which ice, frost or snow are likely to occur on the light emitting face and a heat transfer system for transferring heat to the light emitting face. The automated de-icing system further includes a controller for receiving data from the detector(s) and determining a likelihood of ice, frost or snow forming on the light emitting face. The controller engages the heat transfer system if the likelihood of ice, frost or snow forming on the light emitting face exceeds a threshold.

DETAILED DESCRIPTION

Low power lighting devices having an automated de-icing system are disclosed herein. The automated de-icing system detects conditions under which ice, frost or snow are likely to start building up on a light emitting face of a low power lighting device. Such conditions include, but are not limited to, temperature, humidity, atmospheric pressure, wind direction and speed, etc. Once such conditions are detected, a controller engages a heat transfer system to prevent and/or to remove a buildup of ice, frost, or snow from the light emitting face of the low power lighting device.

Figure 1:
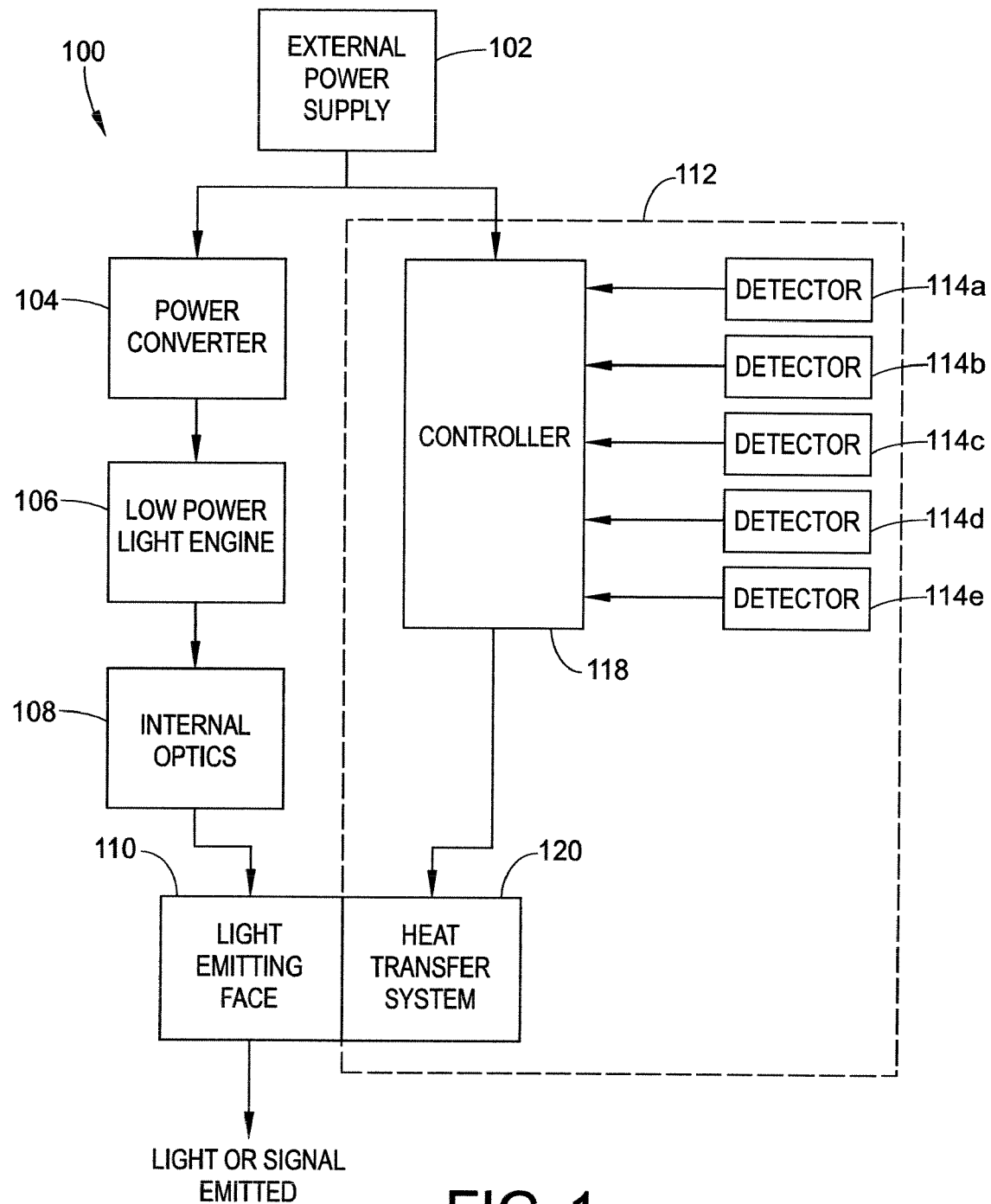
FIG. 1 is a block diagram of a low power lighting system incorporating aspects of the present invention.

With reference to FIG. 1, a block diagram of a low power lighting system 100 is illustrated. The low power lighting system 100 may be, for example, a traffic signal, a wayside rail signal, an area lighting device, a street lighting device, a tunnel lighting device, an architectural lighting device or any other lighting device using one or more Light Emitting Diodes (LEDs). The low power lighting system generally includes an external power supply 102, an optional power converter 104, a low power light engine 106, optional internal optics 108 and a light emitting face 110.

The external power supply 102 is, in certain embodiments, an AC voltage source from, for example, a utility company.

The external power supply 102 may alternatively be a DC voltage source and/or provided by a battery backup system, a generator or other like power sources.

The power converter 104 receives an input voltage from the external power supply 102 and converts the input voltage as necessary for the low power light engine 106. This may entail transforming the input voltage to an appropriate voltage level to drive the low power light engine 106 and/or transforming an AC input voltage to a DC voltage. The power converter 104 may also serve to isolate the low power light engine 106 from the external power supply 102. This may be accomplished with a transformer, for example. As should be appreciated, if the input voltage from the external power supply 102 is appropriate to drive the low power light engine 106, the power converter 104 may be omitted from the low power lighting system 100.

The low power light engine 106 receives an output voltage from the power converter 104, which is used to produce light. The low power light engine 106 includes one or more light emitting diodes (LEDs) and/or other low power light sources. The LEDs and/or other low power light sources may be selected according to the task to which the low power lighting system 100 is assigned. For example, in the case of a stop light, the LEDs and/or other low power light sources may be chosen so as to produce red light.

The light produced by the low power light engine 106 is optionally passed through internal optics 108. The internal optics 108 may be chosen according to the task to which the low power lighting system 100 is assigned. For example, if the lighting system 100 is a spot light, the internal optics 108 may be provisioned to focus the light. The optics may further be provisioned to adjust the color of the light emitted by the low power light engine 106.

The light produced by the low power light engine 106, regardless of whether it passes through internal optics, is expelled through the light emitting face 110 of the lighting assembly 102. The light emitting face 110 is, in certain embodiments, clear and/or translucent so as to allow the light to freely pass therethrough. The light emitting face 110 may also be tinted to adjust the color of the light emitted by the low power light engine 106 and/or include one or more of an anti-fog, anti-glare and reflective coating. Accordingly, in the case of a stop light, for example, the light emitting face may adjust the color of the light emitted by the low power light engine 106 to red.

The low power lighting system 100 further includes an automated de-icing system 112 having a plurality of detectors 114, a controller 118, and a heat transfer system 120. The automated de-icing system 112 may be located internal or external to the low power lighting system 100. If the automated de-icing system 112 is located external to the low power lighting system 100, then the automated de-icing system 112 may be employed to retrofit one or more lighting systems. Additionally, although the components of the automated de-icing system 112 are described together, it should be appreciated that they are discrete parts, which may be used as parts or components of lighting devices.

Each of the detectors 114 serves to measure one or more conditions, which can be used to predict the likelihood of ice, frost or snow forming, and possibly accumulating, on the light emitting face 110 of the lighting system 100. Such conditions include, but are not limited to, temperature, humidity, atmospheric pressure, wind direction and speed, and other like conditions. Accordingly, a first detector 114a may measure temperature of the light emitting face 110, a second detector 114b may measure humidity, a third detector 114c may measure temperature of the external environment, a fourth detector 114d may measure atmospheric pressure, and a fifth detector 114e may measure wind direction and speed. In some embodiments, the detectors 114 may be external to the lighting system 100 and shared between a plurality of automated de-icing systems.

The controller 118 receives data from the detectors 114, and determines whether there is a need to transfer heat to the light emitting face 110 of the low power lighting system 100. The controller 118 makes this determination by analyzing the received data and determining the likelihood of ice, frost or snow forming on the light emitting face 110. If the likelihood of ice, frost, or snow forming on the lighting emitting face 110 exceeds a certain threshold, either explicit or implicit, the controller 118 begins a heat transfer cycle. The heat transfer cycle ends when a sufficient amount of heat has been transferred to the light emitting face 110, so as to prevent the useless overconsumption of power. The controller 118 may also be provisioned to initiate a heat transfer cycle in response manual stimuli. Namely, controlled switches, IR, Bluetooth, RF and other non-contact devices may be used initiate and end a heat transfer cycle.

The threshold is set according to a cost benefit analysis at a level where the operator of the automated de-icing system 112 deems the risk of ice, frost or snow accumulating on the light emitting face 110 as outweighing the energy costs of heating the light emitting face 110. The cost benefit analysis may further include the degree of injury likely if the low power lighting system 100 is functionally impaired because of ice, frost or snow accumulation. For example, at a train crossing, the degree of injury is very high, whereby the threshold might be lower than it would be for a traffic light, for example. In certain embodiments, the threshold may also change according to, for example, the time of day, the time of year, or other like conditions having no relation to the risk of ice, frost or snow forming on the light emitting face 110.

In analyzing the received data, the controller 118 may iterate through the data for each detector 114 and determine a likelihood of ice, frost or snow forming on the light emitting face 110. For example, if the received data for a detector measuring temperature indicates the temperature is below 32 degrees Fahrenheit, the likelihood of ice, frost or snow forming on the light emitting face 110 might be one, and zero otherwise. As should be appreciated, analysis for a detector is only necessary insofar as the received data is unprocessed. A detector may, for example, perform an onboard analysis of the received data and return the likelihood of ice, frost or snow forming on the light emitting face 110 to the controller 118. In certain embodiments, the likelihood of ice, frost or snow forming on the light emitting face 110 for each detector 114 are also normalized, for example, to between zero and one.

Irrespective of whether the controller 118 needs to analyze the received data, in determining the likelihood of ice, frost or snow forming on the light emitting face 110, the controller 118 may use one or more heuristics or equations modeling the likelihood of ice, frost or snow forming on the light emitting face 110. Additionally, different relative weights may be assigned to each of the detectors 114. For example, a first detector (e.g., 114a) may in and of itself be sufficient to trigger the heat transfer cycle, but a second detector (e.g., 114b) may not. Rather, the second detector, in combination with other detectors, may be required to trigger the heat cycle. As should be appreciated, this example does not require an explicit threshold. Nonetheless, a threshold is implicit within the example since a proper combination achieves a likelihood exceeding a threshold.

Figure 2:
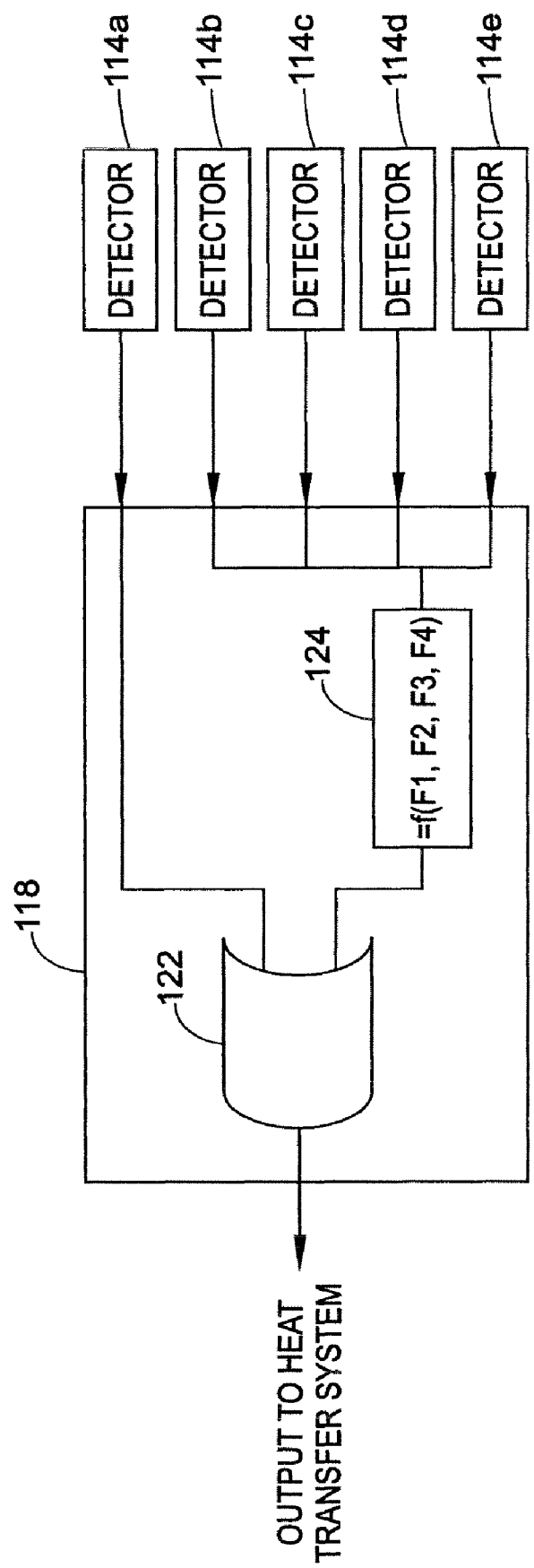
FIG. 2 is a block diagram of a de-icing controller of the low power lighting system of FIG. 1.

With reference to FIG. 2, a block diagram of the controller 118 of the low power lighting system 100 is illustrated. The controller 118 includes an AND gate 122 and a functional block 124 controlling the heat transfer system 120. The functional block 124 receives input data from a plurality of detectors 114b-e and determines whether ice, frost or snow are likely to form on the lighting emitting face 110 based upon this data. The functional block 124 may, for example, be as simple as indicating ice, frost or snow are likely to form when two of the detectors 114b-e indicate this. The AND gate is gated by both the first detector 114a and the functional block 124. Accordingly, to initiate the heat transfer cycle, both gating factors must suggest ice, frost or snow are likely to form on the light emitting face 110.

Notwithstanding FIG. 2, it should be appreciated that more complicated embodiments of the controller 118 may be employed. Further, the controller 118 may be implemented within a computer, or other digital processing device including a digital processor, such as a microprocessor, microcontroller, graphic processing unit (GPU), etc., and storage. In some embodiments, the controller 118 is embodied by a storage medium storing instructions executable (for example, by a digital processor) to perform the aforesaid functions. The storage medium may include, for example, a magnetic disk or other magnetic storage medium, an optical disk or other optical storage medium, a random access memory (RAM), read-only memory (ROM), or other electronic memory device or chip or set of operatively interconnected chips.

Referring back to FIG. 1, the heat transfer system 120 receives control signals from the controller 118 when the controller 118 determines a heat transfer cycle is necessary. The heat transfer cycle serves to transfer heat to the light emitting face 110 of the low power lighting device 100 and prevent ice, frost or snow from forming on the light emitting face 110. The heat transfer system 120 may further receive control signals from the controller 118 when enough heat has been transferred.

In certain embodiments, the heat transfer is accomplished by applying a voltage across a heat conductive material on or within the light emitting face 110 of the low power lighting device 100 may be utilized. For example, resistive material (e.g., flexible conductive traces or wires) on or within the light emitting face 110 of the low power lighting device 100 may be used. In other embodiments, the heat transfer is accomplished by applying a voltage across heat conductive material particles or fibers embedded within the light emitting face 110 of the low power lighting device 100. Naturally, the particles or fibers would be embedded during the manufacturing step, such as molding or casting (additives), whereby the particles or fibers would be an integral part of the light emitting face 110 and advantageously disturb the path of light as little as possible.

Notwithstanding the enumerated methods of transferring heat, other methods for transferring heat to the light emitting face 110 of the low power lighting device 100 may be used. Additionally, non-heat transfer-based methods for preventing the buildup of ice, frost or snow, such as chemical (surface coatings, surface texturing), mechanical (vibration, impact, wipers), etc., may be used in lieu of the heat transfer system 120.

Figure 3:
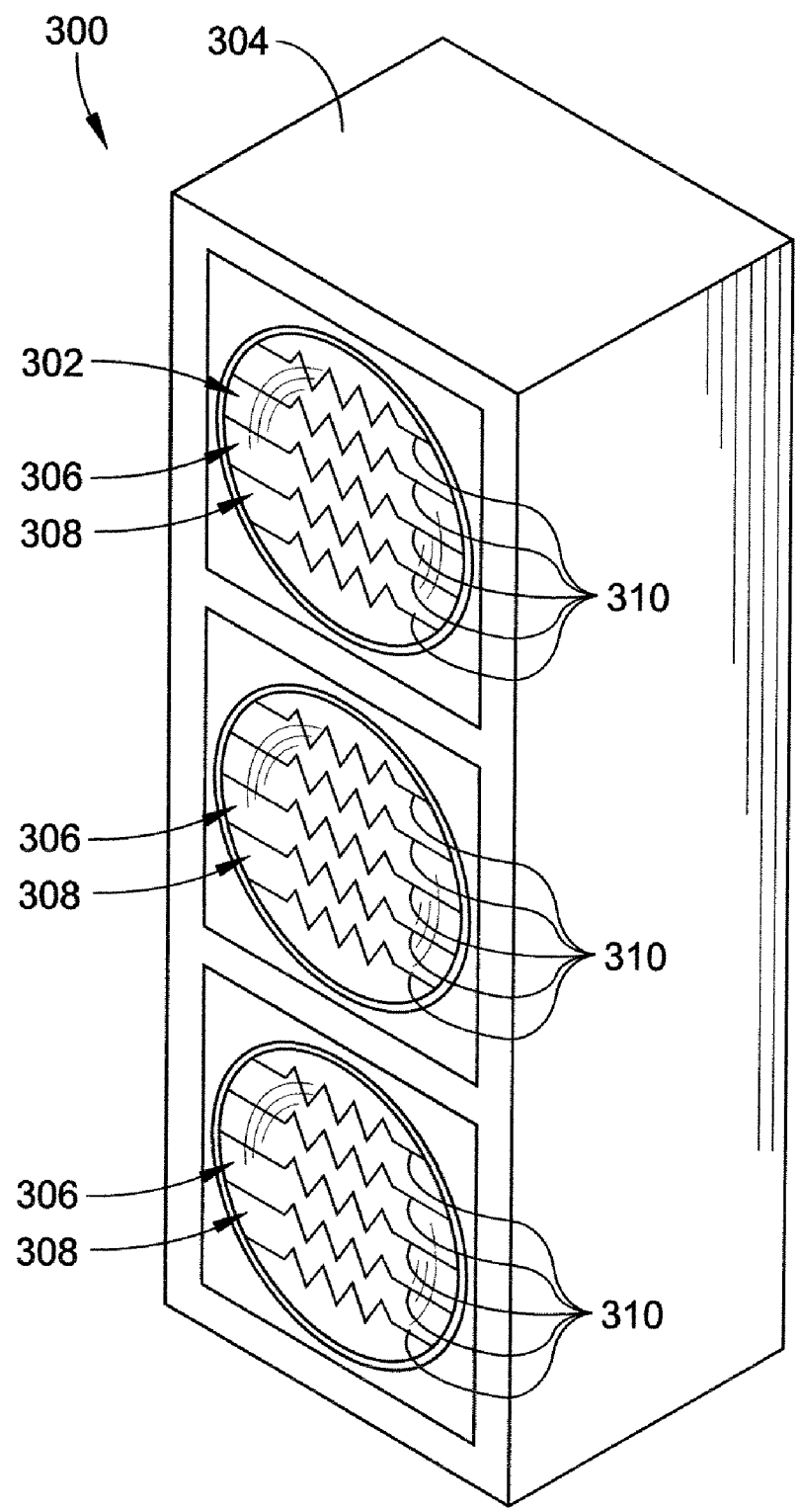
FIG. 3 is a perspective view of a low power lighting system incorporating aspects of the present invention.

With reference FIG. 3, a perspective view of a low power lighting system 300 is illustrated. The low power lighting system 300 is a traffic signal and includes an automated de-icing system 302 (partially shown), a housing 304 and a plurality of LED based light sources 306, each having a light emitting face 308. Disposed within each light emitting face 308 is a plurality of resistive materials 310. Since the low power lighting system 300 is a traffic signal, the plurality of LED based light sources 306 correspondingly produce green, red and yellow light.

The automated de-icing system 302 includes a controller (not shown), one or more detectors (not shown) and a heat transfer system, embodied by the plurality of resistive materials 310. The constituent components of the automated de-icing system 302 are substantially as described in connection with FIGS. 1-2. Additionally, the controller and/or the one or more detectors may be external or internal to the low power lighting system 300.

The controller receives data from the detectors and determines whether there is a need to transfer heat to the light emitting faces 308 of the low power lighting system 300. If the controller determines there is a need to transfer heat to the light emitting faces 308, a heat transfer cycle is initiated. The heat transfer cycle engages (i.e., applies a voltage across) the plurality of resistive materials 310, thereby heating the light emitting faces 308 and preventing the buildup of ice, frost or snow thereon. After a sufficient amount of heat has been transferred to the light emitting faces 308, the heat transfer cycle is disengaged.

In view of the discussion heretofore, it should be appreciated that the low power lighting devices having an automated de-icing system, as disclosed herein, advantageously: (1) detect "favorable" conditions for the accumulation of ice, frost or snow on a light emitting face of a low power lighting device; (2) prevent the buildup of ice, frost or snow, which prevent a low power lighting device from performing its intended function; (3) start a heat transfer cycle before ice, frost or snow start to accumulate on a light emitting face of a low power lighting device; (4) perform the detection, control and heat transfer functions automatically, without human intervention; (4) consume little power at all times, except for the few instances during the year when conditions are such that ice, frost or snow can build up on the light emitting face; (6) do not require seasonal changes, adjustments or set-ups and are functional around the year, around the clock; (7) continue to offer long-life and high reliability over incandescent lighting devices; and (8) retrofit easily into existing lighting fixtures because the low power lighting devices themselves do not change. The foregoing list of benefits is not exclusive, and other benefits will be apparent to those skilled in the art.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. An automated de-icing system for a low power lighting device having a light emitting face, the system comprising:
    at least one detector for detecting conditions under which ice, frost or snow are likely to occur on the light emitting face;
    a heat transfer system for transferring heat to the light emitting face; and
    a controller for receiving data from the at least one detector and determining a likelihood of ice, frost or snow forming on the light emitting face, wherein the controller engages the heat transfer system if the likelihood of ice, frost or snow forming on the light emitting face exceeds a threshold;

wherein the controller determines the likelihood of ice, frost or snow forming on the light emitting face according to different relative weights of a plurality of detectors of the at least one detector.

2. The automated de-icing system of claim 1, wherein the at least one detector includes a detector for detecting one of temperature, relative humidity, atmospheric pressure, and wind direction and velocity.

3. The automated de-icing system of claim 1, wherein the heat transfer system includes heat conductive material on or embedded within the light emitting face.

4. The automated de-icing system of claim 3, wherein the heat transfer system includes resistive material on or embedded within the light emitting face.

5. The automated de-icing system of claim 1, wherein the low power lighting device is a traffic signal, a wayside rail signal, an area lighting device, a street lighting device, a tunnel lighting device, or an architectural lighting device.

6. The automated de-icing system of claim 1, wherein the automated de-icing system is installed within a housing of the low power lighting device.

7. The automated de-icing system of claim 1, wherein the controller and/or the at least one detector are external to a housing of the low power lighting device.

8. An automated de-icing method for a low power lighting device having a light emitting face, the method comprising:
    detecting at least one condition under which ice, frost or snow is likely to occur on the light emitting face;
    receiving data of the at least one condition;
    determining a likelihood of ice, frost or snow forming on the light emitting face from the received data, the determination performed before formation of ice, frost or snow;
    transferring heat to the light emitting face if the likelihood of ice, frost or snow forming on the light emitting face exceeds a threshold; and
    assigning different relative weights to received data of a plurality of conditions of the at least one condition, wherein the likelihood of ice, frost or snow forming on the light emitting face is determined using the relative weights.

9. The automated de-icing method of claim 8, wherein the at least one condition is one of temperature, relative humidity, atmospheric pressure, and wind direction and velocity.

10. The automated de-icing method of claim 8, wherein the heat is transferred via a heat conductive material on or embedded within the light emitting face.

11. The automated de-icing method of claim 10, wherein the heat is transferred via resistive materials on or embedded within the light emitting face.

12. The automated de-icing method of claim 8, wherein the low power lighting device is a traffic signal, a wayside rail signal, an area lighting device, a street lighting device, a tunnel lighting device, or an architectural lighting device.

13. The automated de-icing method of claim 8, wherein the automated de-icing method is performed within a housing of the low power lighting device.

14. The automated de-icing method of claim 8, wherein the automated de-icing method is performed external to a housing of the low power lighting device.

15. A low power lighting system comprising: a housing having one or more LEDs disposed therein, wherein the housing includes an light emitting face, and an automated de-icing system comprising:
    at least one detector for detecting conditions under which ice, frost or snow are likely to occur on the light emitting face;
    a heat transfer system for transferring heat to the light emitting face; and
    a controller for receiving data from the at least one detectors and determining a likelihood of ice, frost or snow forming on the light emitting face, the determination performed before formation of ice, frost or snow, wherein the controller engages the heat transfer system if the likelihood of ice, frost or snow forming on the light emitting face exceeds a threshold;
    wherein the controller determines the likelihood of ice, frost or snow forming on the light emitting face according to different relative weights of a plurality of detectors of the at least one detector.

16. The low power lighting system of claim 15, wherein the at least one detector includes a detector for detecting one of temperature, relative humidity, atmospheric pressure, and wind direction and velocity.

17. The low power lighting system of claim 15, wherein the automated de-icing system is installed within the housing.

* * * * *